United States Patent
Zhu et al.

(10) Patent No.: US 11,501,779 B2
(45) Date of Patent: *Nov. 15, 2022

(54) BLUETOOTH SPEAKER BASE, METHOD AND SYSTEM FOR CONTROLLING THEREOF

(71) Applicant: BAIDU ONLINE NETWORK TECHNOLOGY (BEIJING) CO., LTD., Beijing (CN)

(72) Inventors: Xujie Zhu, Beijing (CN); Jingran Li, Beijing (CN); Chao Tian, Beijing (CN); Shoukuan Wang, Beijing (CN); Lili Wang, Beijing (CN); Wei Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 71 days.

This patent is subject to a terminal disclaimer.

(21) Appl. No.: 17/170,680

(22) Filed: Feb. 8, 2021

(65) Prior Publication Data

US 2021/0166697 A1 Jun. 3, 2021

Related U.S. Application Data

(63) Continuation of application No. 16/813,070, filed on Mar. 9, 2020, now Pat. No. 10,950,238.

(30) Foreign Application Priority Data

Jun. 19, 2019 (CN) .......................... 201910532552.X

(51) Int. Cl.
*G10L 15/08* (2006.01)
*G10L 15/26* (2006.01)
(Continued)

(52) U.S. Cl.
CPC .............. *G10L 15/26* (2013.01); *G10L 15/22* (2013.01); *H04M 1/72412* (2021.01);
(Continued)

(58) Field of Classification Search
CPC . G06F 3/16; H04W 4/80; G10L 15/08; G10L 15/22; G10L 15/18; G10L 15/30;
(Continued)

(56) References Cited

U.S. PATENT DOCUMENTS

2019/0180740 A1* 6/2019 Nandy .................... G10L 15/30

* cited by examiner

*Primary Examiner* — Tu X Nguyen
(74) *Attorney, Agent, or Firm* — Lathrop GPM LLP

(57) ABSTRACT

The present disclosure provides a Bluetooth speaker base, a method and a system for controlling a Bluetooth speaker base. The method includes: acquiring voice data, and determining whether the voice data includes a wake-up word, when positions of the Bluetooth speaker base and a Bluetooth speaker satisfy a preset condition; controlling the Bluetooth speaker base to enter a wake-up recognition state, and compressing the voice data based on a compression ratio, when the voice data includes the wake word; and sending the voice data compressed to a mobile terminal through a first profile, to cause the mobile terminal to decompress the voice data received, send the voice data decompressed to a server for voice recognition to obtain audio data, and send the audio data to the Bluetooth speaker for playback through a second profile.

18 Claims, 3 Drawing Sheets

(51) Int. Cl.
*H04W 4/80* (2018.01)
*H04M 1/72412* (2021.01)
*G10L 15/22* (2006.01)

(52) U.S. Cl.
CPC ......... *H04W 4/80* (2018.02); *G10L 2015/223* (2013.01); *H04M 2250/02* (2013.01); *H04R 2420/07* (2013.01)

(58) Field of Classification Search
CPC ......... G10L 17/24; G10L 25/06; G10L 25/51; G10L 25/78
See application file for complete search history.

BLUETOOTH SPEAKER BASE, METHOD AND SYSTEM FOR CONTROLLING THEREOF

CROSS-REFERENCE TO RELATED APPLICATIONS

This application is a Continuation of U.S. application Ser. No. 16/813,070 filed Mar. 9, 2020, which claims priority to Chinese Patent Application No. 201910532552.X, filed Jun. 19, 2019. The entire contents of the aforementioned applications is incorporated herein by reference.

TECHNICAL FIELD

The present disclosure relates to the field of communication technology, and more particularly, to a Bluetooth speaker base, a method and a system for controlling a Bluetooth speaker base.

BACKGROUND

In the related art, Bluetooth speakers usually adopt standard Bluetooth 4.2 and BLE (Bluetooth Low Energy) technology for bidirectional communication. In a normal play mode, the A2DP (Advanced Audio Distribution Profile) is most used for audio playback, and the uplink can only use BLE to transmit data. To ensure Bluetooth playback stability, the BLE transmission rate is generally limited to 16 kbps (also called bit rate, which refers to the transmission rate of digital signals). In the conversation state, HFP (Hands-free Profile) is most used for communication, the uplink and downlink transmission rates are 16 kbps only.

SUMMARY

Embodiments of a first aspect of the present disclosure provide a method for controlling a Bluetooth speaker base. The method includes: acquiring voice data, and determining whether the voice data includes a wake-up word, when positions of the Bluetooth speaker base and a Bluetooth speaker satisfy a preset condition; controlling the Bluetooth speaker base to enter a wake-up recognition state, and compressing the voice data based on a compression ratio, when the voice data includes the wake word; and sending the voice data compressed to a mobile terminal through a first profile, to cause the mobile terminal to decompress the voice data received, send the voice data decompressed to a server for voice recognition to obtain audio data, and send the audio data to the Bluetooth speaker for playback through a second profile.

Embodiments of a second aspect of the present disclosure provide a Bluetooth speaker base. The Bluetooth speaker base includes a voice acquisition module, a digital signal processing module, and a Bluetooth chip. The voice acquisition module is configured to acquire ambient voice when positions of the Bluetooth speaker base and a Bluetooth speaker satisfy a preset condition. The digital signal processing module is configured to receive the ambient voice sent by the voice acquisition module, perform signal processing on the ambient voice to obtain voice data, and send the voice data to a Bluetooth chip when the voice data includes a wake-up word. The Bluetooth chip is configured to compress the voice data based on a compression ratio, and send the voice data compressed to a mobile terminal through a first profile, to cause the mobile terminal to decompress the voice data received, send the voice data decompressed to a server for voice recognition to obtain audio data, and send the audio data to the Bluetooth speaker for playback through a second profile.

Embodiments of a third aspect of the present disclosure provide a system for controlling a Bluetooth speaker base. The system includes a Bluetooth speaker, a Bluetooth speaker base, a mobile terminal and a server. The Bluetooth speaker base is configured to, when a Bluetooth speaker is placed on the Bluetooth speaker base, acquire voice data, determine whether the voice data includes a wake-up word, and when the voice data includes the wake-up word, compress the voice data based on a compression ratio, and send the voice data compressed to the mobile terminal through a first profile. The mobile terminal is configured to receive the voice data compressed, decompress the voice data received, and send the voice data decompressed to a server. The server is configured to perform voice recognition on the voice data sent by the mobile terminal to obtain audio data, and send the audio data to the mobile terminal. The Bluetooth speaker is configured to receive the audio data sent by the mobile terminal through a second profile, and control an audio output module in the Bluetooth speaker to play the audio data.

Embodiments of a fourth aspect of the present disclosure provide a Bluetooth speaker base. The Bluetooth speaker base includes a memory, a processor, and a computer program stored in the memory and executable by the processor. When the processor executes the computer program, the method for controlling a Bluetooth speaker base according to embodiments of the present disclosure is implemented.

Embodiments of a fifth aspect of the present disclosure provide a computer-readable storage medium having a computer program stored thereon. When the computer program is executed by a processor, the method for controlling a Bluetooth speaker base according to embodiments of the present disclosure is implemented.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
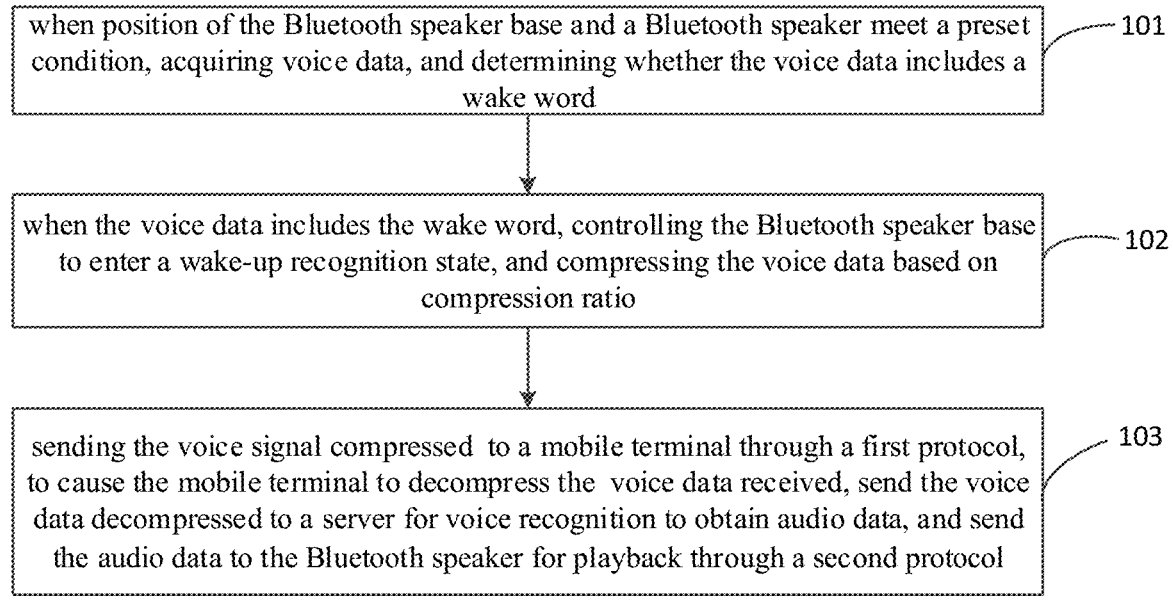
FIG. 1 is a flowchart of a method for controlling a Bluetooth speaker base according to some embodiments of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

However, the current problem is that, the total average uplink and downlink data transmission bandwidth is fixed, when the downlink audio playback quality is guaranteed (i.e., the downlink transmission rate is increased), the delay of voice interaction from wake-up to recognition may be longer, generally more than 2 seconds, which affects the user experience. Moreover, when the response speed of voice interaction from wake-up to recognition is ensured to be unnoticeable by the user (i.e., the uplink transmission rate is increased), the downlink audio playback quality needs to be greatly reduced. In addition, when the HFP is used to implement bidirectional Bluetooth transmission, since the HFP only supports conversation data transmission, and the uplink and downlink transmission rates are only 16 kbps, the real-time requirements of voice interaction cannot be met, and the quality of downlink content playback quality is affected.

The Bluetooth speaker base, and the method and system for controlling the Bluetooth speaker base according to embodiments of the present disclosure are described below with reference to the accompany drawing.

In embodiments of the present disclosure, the Bluetooth speaker base is a hardware device that carries the Bluetooth speaker, it may be any device used with the Bluetooth speaker, such as a carrier base having the function of the Bluetooth speaker base of the present disclosure, or a Bluetooth speaker charger having the function of the Bluetooth speaker base of the present disclosure, which is not limited. By using the Bluetooth speaker base, the far-field interaction experience of the Bluetooth speaker may be improved without changing the inherent structure of the Bluetooth speaker. In addition, the Bluetooth speaker base only has a data processing module and a Bluetooth chip, which can increase the function of the Bluetooth speaker at a low cost.

FIG. 1 is a flowchart of a method for controlling a Bluetooth speaker base according to some embodiments of the present disclosure. It should be noted that the control according to embodiment of the present disclosure may be applied for a Bluetooth speaker base.

As illustrated in FIG. 1, the method may include the following acts.

At block 101, when positions of the Bluetooth speaker base and a corresponding Bluetooth speaker meet a preset condition, voice data is acquired, and it is determined whether the voice data includes a wake-up word.

At block 102, when the voice data includes the wake-up word, the Bluetooth speaker base is controlled to enter a wake-up recognition state, and the voice data is compressed by a preset compression ratio.

It should be understood that the Bluetooth speaker base according to embodiments of the present disclosure is configured to expand the function of the Bluetooth speaker, and also depends on the playback function of the Bluetooth speaker. In order to achieve mutual cooperation of the functions of the Bluetooth speaker base and the Bluetooth speaker, it is detected whether the positions of the Bluetooth speaker base and the corresponding Bluetooth speaker meet the preset condition, to determine whether the two can operate cooperatively, so as avoid the Bluetooth speaker base or the Bluetooth speaker operating alone, which results in a waste of resources.

On the one hand, in order to ensure that the Bluetooth speaker base and the Bluetooth speaker meet scene requirements of the same area (such as a music playback scene, the location of the request voice signal input by the user and the received music playback location are within an area range), the preset condition may include determining whether the Bluetooth speaker is close to the Bluetooth speaker base, such as detecting whether the Bluetooth speaker is placed on the Bluetooth speaker base, or whether the Bluetooth speaker base is coupled to the Bluetooth speaker circuit, or whether range of the Bluetooth speaker and the Bluetooth speaker base is in a preset range.

On the other hand, in order to ensure that the Bluetooth speaker base and the Bluetooth speaker meet scene requirements of different areas (for example, the user A wants to play an audio to the user B in another place, the Bluetooth speaker may be set at the location where the user B locates, and the Bluetooth speaker base may set at the location where the user A locates), the preset condition may include determining whether the Bluetooth speaker and the Bluetooth speaker base are at two preset locations. For example, the user A wants to play a song to the user B in another room, the Bluetooth speaker may be placed at the room where the user B locates, and the Bluetooth speaker base may be placed locally (such as the location where the user A locates), such that the voice information acquisition and playback are separated, meeting the requirements of more scenes.

In some embodiment, in order to avoid the waste of resources, improve user experience, and ensure effective voice interaction of the Bluetooth speaker base, after the voice data collected by the Bluetooth speaker base is acquired, it may be determined whether the voice data collected includes the wake-up word, when the wake-up word is included, the Bluetooth speaker base may be controlled to enter the wake-up recognition state, and the collected voice data may be compressed by the preset compression ratio. In other words, after the voice data collected by the Bluetooth speaker base is acquired, the Bluetooth speaker base may determine whether the voice data collected includes the wake-up word, such as "wake up", "hello", "open", "start", etc., when the wake-up word is included, the Bluetooth speaker base may be controlled to enter the wake-up recognition state. In this case, the collected voice data may be compressed by the preset compression ratio.

In an embodiment of the present disclosure, when it is determined that the voice data collected does not include the wake-up word, the RMP module can be controlled to stay in the sleep state, and the Bluetooth speaker may be controlled to continue playing the downlink audio data, so as not to affect the user experience.

The preset compression ratio may be pre-negotiated by the Bluetooth speaker base and the mobile terminal. The mobile terminal may be a hardware device with various operating systems, such as a mobile phone, a tablet computer, and a personal digital assistant. The setting of the compression ratio may be related to the quality of the Bluetooth channel and the signal of the Bluetooth chip in the environment where the Bluetooth speaker base is located. For example, in a clean environment, a low compression ratio (such as 2 times, 4 times) may be set, and in a noisy environment, a high compression ratio (such as 8 times, 16 times) may be set. Generally, when only Bluetooth is working, the environment is considered clean. When Bluetooth and WiFi work together, and the WiFi throughput is large, the two may interfere with each other, and the environment is considered noisy. The noisy or clean is related to the environment, and the compression ratio may be set by judging and debugging the environment. Understandably, the lower the compression ratio is, the better the recognition rate of the voice is.

In some embodiments of the present disclosure, the Bluetooth speaker base may include a voice acquisition module and a digital signal processing module. The voice acquisition module may be a microphone array, the microphone array is configured to acquire the voice of the surrounding environment, and the digital signal processing module is configured to perform signal processing on the collected voice to obtain the voice data. After the voice data is acquired, the quality of the Bluetooth channel and the signal of the Bluetooth chip in the environment where the Bluetooth speaker base is located can be detected, based on the detected quality of the Bluetooth channel and the signal of the Bluetooth chip, the compression ratio may be negotiated with the mobile terminal, and the voice data may be compressed by the negotiated compression ratio.

At block 103, the compressed voice signal is sent to the mobile terminal through a first profile, to cause the mobile terminal to decompress the voice data received, send the voice data decompressed to a server for voice recognition to obtain audio data, and send the audio data to the Bluetooth speaker for playback based on a second profile.

Figure 2:
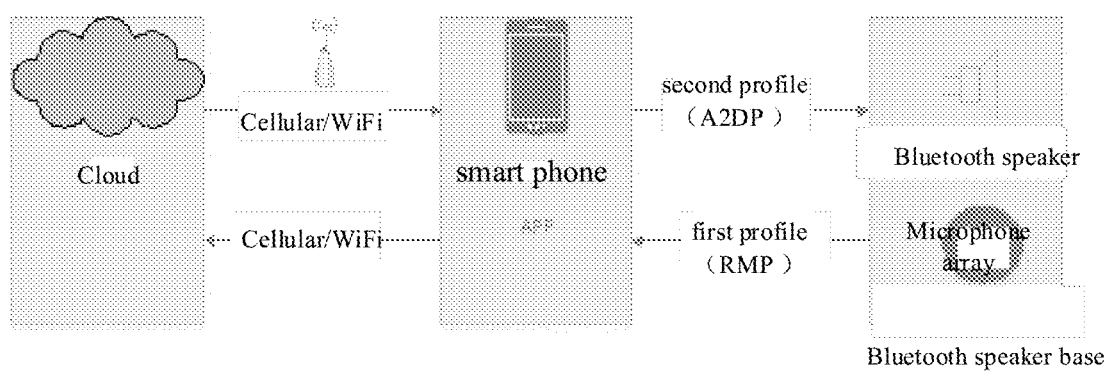
FIG. 2 is a schematic diagram of an application scenario of a method for controlling a Bluetooth speaker base according to some embodiments of the present disclosure.

In embodiments of the present disclosure, FIG. 2 is a schematic diagram of an application scenario of a method for controlling a Bluetooth speaker base according to some embodiments of the present disclosure, as illustrated in FIG. 2, a first profile connection between the mobile terminal and the Bluetooth speaker base and a second profile connection between the mobile terminal and the Bluetooth speaker need to be established in advance. In actual implementation, the mobile terminal can scan the Bluetooth speaker base and the Bluetooth speaker, when the Bluetooth speaker base and the Bluetooth speaker are scanned, the mobile terminal may send a connection establishment request to the Bluetooth speaker and the Bluetooth speaker base. When the Bluetooth speaker and the Bluetooth speaker base receive the request, the first profile connection and the second profile connection with the mobile terminal may be established, respectively. In some embodiments of the present disclosure, the Bluetooth speaker base may include, but is not limited to, a first profile module corresponding to the first profile, and the Bluetooth speaker may include, but is not limited to, a second profile module corresponding to the second profile. In the embodiment of the present disclosure, the first profile connection between the Bluetooth speaker base and the mobile terminal may be established through the first profile module corresponding to the first profile, and the second profile connection between the Bluetooth speaker and the mobile terminal may be established through the second profile module of the second profile. In an example, the first profile may be a private RMP, and the second profile may be a standard A2DP.

The Bluetooth speaker base may establish the first profile connection (such as the private RMP) through the first profile, and the Bluetooth speaker may establish the second profile connection (such as the standard A2DP) through the second profile, such that based on the first profile connection and the second profile connection, the bidirectional transmission of Bluetooth voice data with the mobile terminal can be achieved. In the embodiment of the present disclosure, the bidirectional transmission may include the uplink data transmission and the downlink data transmission, the Bluetooth speaker base may implement the uplink data transmission based on the first profile connection, and the Bluetooth speaker may implement the downlink data transmission based on the second profile connection.

As illustrated in FIG. 2, the mobile terminal is a smart phone, and the uplink data transmission in the bidirectional Bluetooth data transmission is implemented between the Bluetooth speaker base and the mobile phone, and the downlink data transmission in the bidirectional Bluetooth data transmission is implemented between the Bluetooth speaker and the mobile phone. The uplink data transmission portion is completed based on the private RMP, and the downlink data transmission portion is completed based on the standard A2DP. It should also be noted that, in some embodiments of the present disclosure, the first profile module corresponding to the first profile may be disposed between the RFCOMM (radio frequency communication) layer and an application layer of the Bluetooth chip in the Bluetooth speaker base. That is, the first profile may be run between the RFCOMM layer and the application layer in the Bluetooth chip.

Figure 3:
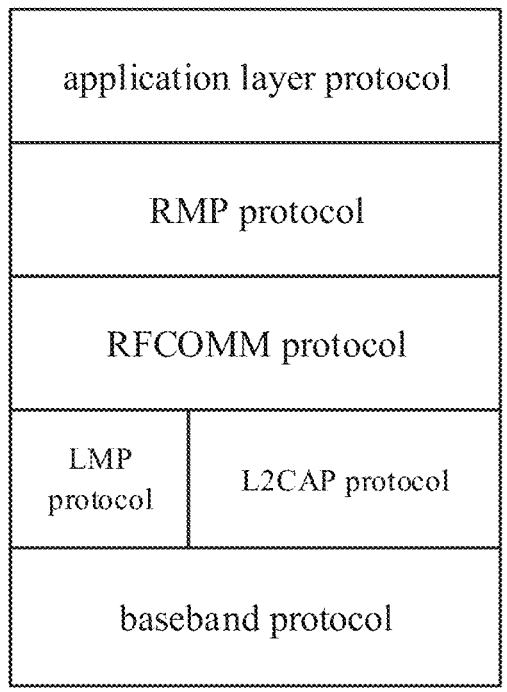
FIG. 3 is a schematic diagram illustrating a Bluetooth protocol stack in a Bluetooth chip according to some embodiments of the present disclosure.

In an example, FIG. 3 is a schematic diagram illustrating a Bluetooth protocol stack in a Bluetooth chip according to some embodiments of the present disclosure. As illustrated in FIG. 3, the Bluetooth protocol stack of the Bluetooth chip may include a baseband protocol, a link management protocol (LMP), a logical link control and adaptation protocol (L2CAP), and a RFCOMM protocol, a private RMP protocol, and an application layer protocol. The private RMP protocol runs between the RFCOMM layer and the application layer of the Bluetooth chip.

Moreover, after the voice data is compressed, the compressed voice data may be sent to the mobile terminal based on the first profile. When the mobile terminal receives the voice data, the mobile terminal may decompress the voice data, and send the decompressed voice data to the server, to cause the server to perform voice recognition on the voice data, and generate audio data based on the recognition result, so as to obtain the recognized audio data. After the recognized audio data is obtained, the server may send the audio data to the mobile terminal, such that the mobile terminal sends the audio data to the Bluetooth speaker based on the second profile. For example, the voice data collected by the Bluetooth speaker base is "play song A", the Bluetooth speaker base may send the voice data to the mobile terminal through the first profile connection. The mobile terminal may forward the voice data to the server, such that the server may perform recognition on the voice data, and obtain the corresponding response data such as audio data of "song A" according to the recognition result, and the audio data of "song A" may be sent to the Bluetooth speaker through the mobile terminal for audio playback of "song A".

For example, as illustrated in FIG. 2, the server may send the recognized audio data to the mobile terminal, and the mobile terminal may send the audio data to the Bluetooth speaker through the A2DP. When the audio data sent by the mobile terminal is received, the Bluetooth speaker may play the audio data through its audio output module (such as a playback module, a speaker, etc.), thereby achieving the voice recognition and interaction function between the Bluetooth speaker and the mobile terminal.

It should be noted that, in some embodiments of the present disclosure, the RMP module may include an instruction transmission sub-module and a voice link sub-module. The instruction transmission sub-module may be configured for interrupt processing of device information interaction and voice wake-up, and the voice link sub-module may be configured for stable voice data transmission, and to disconnect the link of RFCOMM (a Bluetooth virtual serial port) and SPP (Serial Port Profile), and control the RMP module to enter the sleep mode, when there is no data transmission for a long time. The RMP module may include various states. For example, the RMP module may include an idle state, a waiting for wake-up recognition state, a wake-up recognition state, and a busy state.

Figure 4:
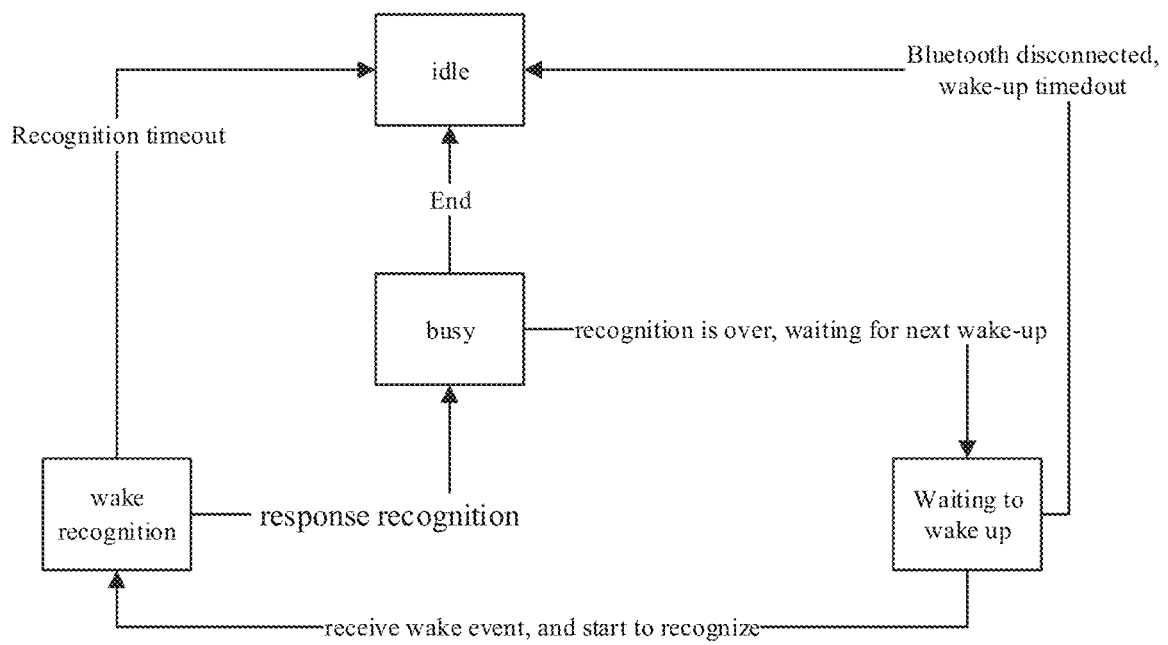
FIG. 4 is a schematic diagram illustrating state switching of a RMP (Remote Mic Profile) module according to some embodiments of the present disclosure.

FIG. 4 illustrates a state switching of a RMP module according to some embodiments of the present disclosure. The idle state may indicate the initialization state, and application initialization for establishing the connection. The waiting for wake-up recognition state may indicate that the Bluetooth RMP module, the A2DP module and the network link are connected, preparation work is completed, and the Bluetooth speaker is idle, waiting to wake up. The wake recognition state may indicate that the wake event is received, recognition is started, such as receiving the voice data to be recognized, decoding the voice data, responding to recognition, and entering the busy state. When no response is received from the mobile terminal for a long time, it may be considered that the link is disconnected, and the idle state may be entered. The busy state may indicate the recognition response state, the audio output module of the Bluetooth speaker plays the voice, and after the recognition is completed, the waiting for wake-up recognition state is entered.

The differences between the RMP according to embodiments of the present disclosure and the BLE protocol and the HFP in the related art lie in that, the RMP can support transmission of voice interactive audio signals between the Bluetooth speaker base and other devices, in the process of voice data transmission with other devices, when the data is transmitted through the first profile connection, the compression ratio may be negotiated with the terminal device. By dynamically negotiating the manner of compressing the data to achieve voice and audio data compression, the maximum data transmission volume can be ensured in the current environment, and the uplink voice transmission rate of the Bluetooth speaker can be improved. Moreover, since the uplink data and the downlink data are implemented in different devices, the downlink data transmission rate of the Bluetooth speaker will not be affected, thereby achieving the high-speed bidirectional Bluetooth transmission.

With the method for controlling the Bluetooth speaker base according to embodiments of the present disclosure, the first profile connection and the second profile connection with the mobile terminal are established through the Bluetooth speaker base and the Bluetooth speaker, respectively, the voice data collected by the Bluetooth speaker base is obtained and compressed based on the preset compression ratio, and the compressed voice data is sent to the mobile terminal through the first profile connection. When the mobile terminal receives the voice data, the mobile terminal may decompress the received voice, and send the decompressed voice data to the server for voice recognition, so as to obtain the audio data. Then, the audio data returned by the mobile terminal may be received based on the second profile connection, and the audio output module of the Bluetooth speaker may be controlled to play the audio data, thereby achieving the voice recognition and interaction between the Bluetooth speaker and the Bluetooth speaker base and the mobile terminal, i.e., the bidirectional transmission of Bluetooth voice data between the Bluetooth speaker and the Bluetooth speaker base and the mobile terminal is achieved through the first profile connection and the second profile connection.

The first profile connection is the connection between the Bluetooth speaker base and the mobile terminal, it does not affect the transmission of voice interactive audio signal between the Bluetooth speaker and other devices. In addition, when the data is transmitted through the first profile connection, the compression ratio is negotiated with the terminal device, the voice and audio data compression is achieved by dynamically negotiating the data compression manner, the maximum data transmission volume can be ensured in the current environment, the bidirectional transmission rate of Bluetooth voice data can be improved, the high-speed bidirectional transmission of Bluetooth voice data can be achieved, and the voice recognition rate can be improved. Moreover, while ensuring the downlink audio playback quality of the Bluetooth speaker, and without changing the structure of the Bluetooth speaker, the delay of voice interaction from wake-up to recognition can be reduced, thereby improving user experience.

Figure 5:
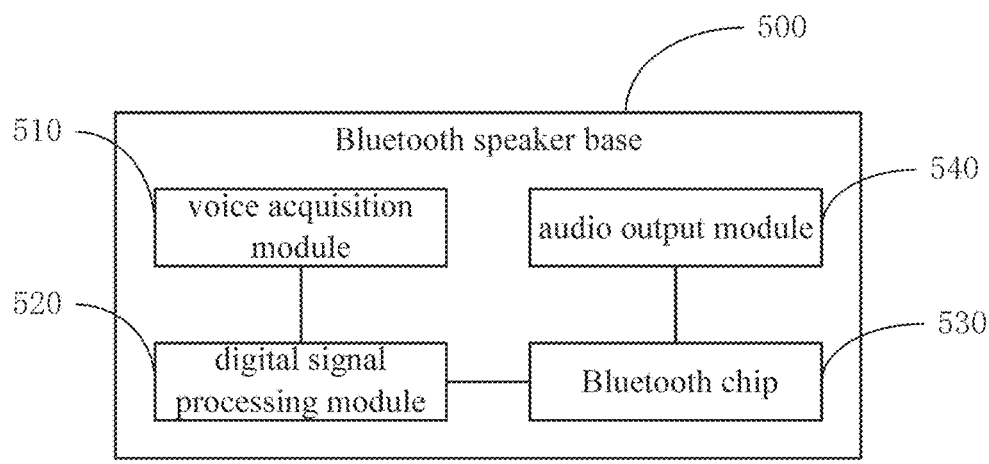
FIG. 5 is a block diagram of a Bluetooth speaker base according to some embodiments of the present disclosure.

Embodiments of the present disclosure also provide a Bluetooth speaker base. FIG. 5 is a schematic diagram of a Bluetooth speaker base according to some embodiments of the present disclosure. As illustrated in FIG. 5, the Bluetooth speaker base includes a voice acquisition module 510, a digital signal processing module 520, a Bluetooth chip 530, and an audio output module 540.

The voice acquisition module 510 may be configured to acquire ambient voice, when positions of the Bluetooth speaker base and a corresponding Bluetooth speaker meet a preset condition. In some embodiments, the voice acquisition module 510 may be a microphone array, and the microphone array may collect voice of the surrounding environment. In the present invention, there may be two or more microphone arrays, which is not limited.

The digital signal processing module 520 is configured to receive the ambient voice collected by the voice acquisition module 510, perform signal processing on the ambient voice to obtain voice data, and send the voice data to the Bluetooth chip 530 when the voice data includes a wake-up word.

The Bluetooth chip 530 is configured to compress the voice data based on the preset compression ratio, and send the compressed voice signal to the mobile terminal through the first profile, to cause the mobile terminal to decompress the voice data received, send the voice data decompressed to a server for voice recognition to obtain audio data, and send the audio data to the Bluetooth speaker through a second profile.

The Bluetooth chip 530 includes a first profile module. The Bluetooth chip 530 is configured to establish a first profile connection between the Bluetooth speaker base and the mobile terminal through the first profile module. In an example, the first profile is a private RMP, and the second profile is a standard A2DP.

In some embodiments of the present disclosure, the mobile terminal may be a hardware device with various operating systems, such as a mobile phone, a tablet computer, and a personal digital assistant. For example, the mobile terminal is a smart phone, with the Bluetooth speaker as the center, the bidirectional Bluetooth data transmission between the Bluetooth speaker and the mobile phone may include uplink data transmission and downlink data transmission, the uplink data transmission portion is completed based on the private RMP, and the downlink data transmission portion is completed based on the standard A2DP.

In some embodiments of the present disclosure, the first profile module is disposed between the RFCOMM layer and the application layer of the Bluetooth chip 530.

In order to increase the uplink data transmission rate of the Bluetooth speaker, and improve the speech recognition rate, in some embodiments of the present disclosure, the digital signal processing module 520 may be configured to compress the voice data based on the preset compression ratio through the RMP, and send the compressed voice data to the Bluetooth chip 530. When the digital signal processing module 520 sends the interruption identification for wake-up to the Bluetooth chip 530, the digital signal processing module 520 may send the voice data to the Bluetooth chip 530 through the RMP. The voice data may be compressed based on the preset compression ratio, and the compressed voice data may be sent to the Bluetooth chip 530, thereby improving the transmission rate of the voice data.

With the Bluetooth speaker base according to embodiments of the present disclosure, the first profile connection and the second profile connection with the mobile terminal are established through the Bluetooth speaker base and the Bluetooth speaker, respectively, the voice data collected by the Bluetooth speaker base is obtained and compressed based on the preset compression ratio, and the compressed voice data is sent to the mobile terminal through the first profile connection. When the mobile terminal receives the voice data, the mobile terminal may decompress the received voice, and send the decompressed voice data to the server for voice recognition, so as to obtain the audio data. Then, the audio data returned by the mobile terminal may be received based on the second profile connection, and the audio output module of the Bluetooth speaker may be controlled to play the audio data, thereby achieving the voice recognition and interaction between the Bluetooth speaker and the Bluetooth speaker base and the mobile terminal, i.e., the bidirectional transmission of Bluetooth voice data between the Bluetooth speaker and the Bluetooth speaker base and the mobile terminal is achieved through the first profile connection and the second profile connection.

The first profile connection is the connection between the Bluetooth speaker base and the mobile terminal, it does not affect the transmission of voice interactive audio signal between the Bluetooth speaker and other devices. In addition, when the data is transmitted through the first profile connection, the compression ratio is negotiated with the terminal device, the voice and audio data compression is achieved by dynamically negotiating the data compression manner, the maximum data transmission volume can be ensured in the current environment, the bidirectional transmission rate of Bluetooth voice data can be improved, the high-speed bidirectional transmission of Bluetooth voice data can be achieved, and the voice recognition rate can be improved. Moreover, while ensuring the downlink audio playback quality of the Bluetooth speaker, and without changing the structure of the Bluetooth speaker, the delay of voice interaction from wake-up to recognition can be reduced, thereby improving user experience.

Figure 6:
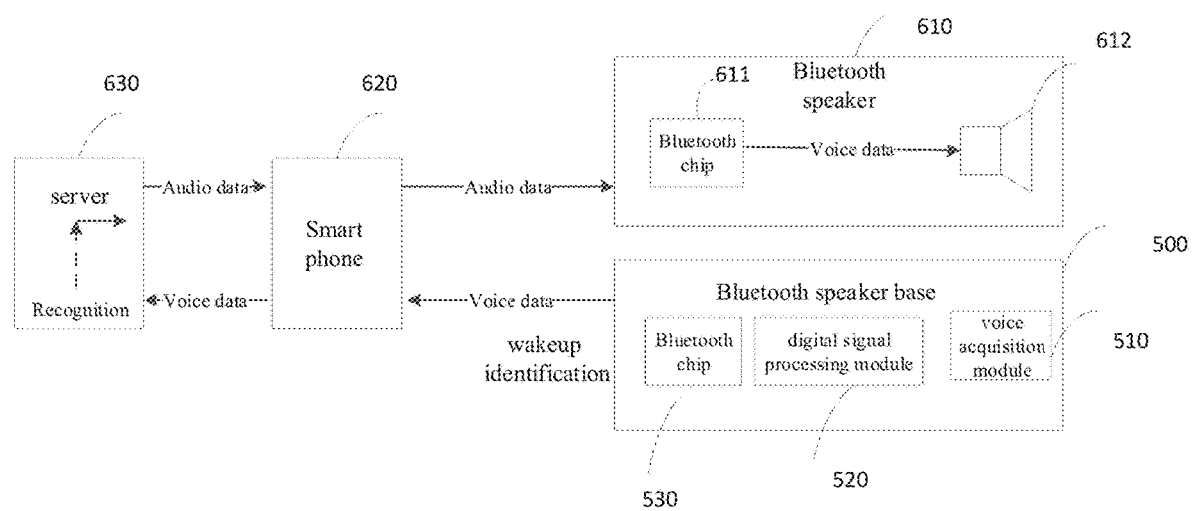
FIG. 6 is a schematic diagram of a system for controlling a Bluetooth speaker base according to some embodiments of the present disclosure.

Embodiments of the present disclosure further provide a system for controlling a Bluetooth speaker base. FIG. 6 is a schematic diagram of a system for controlling a Bluetooth speaker base according to some embodiments of the present disclosure. As illustrated in FIG. 6, the system includes a Bluetooth speaker 610, a Bluetooth speaker base 500, a mobile terminal 620, and a server 630.

The Bluetooth speaker base 500 is configured to, when a Bluetooth speaker is placed on a Bluetooth speaker base, acquire voice data, determine whether the voice data includes a wake-up word, compress the voice data based on a preset compression ratio when the voice data includes the wake word, and send the compressed voice signal to the mobile terminal 620 through a first profile. The mobile terminal 620 is configured to receive the compressed voice signal, decompress the received voice data, and send the decompressed voice data to the server 630. The server 630 is configured to perform voice recognition on the voice data sent by the mobile terminal 620 to obtain audio data, and send the audio data to the mobile terminal 620. The Bluetooth speaker 610 is configured to receive the audio data sent by the mobile terminal 620 through a second profile, and control an audio output module in the Bluetooth speaker to play the audio data.

FIG. 6 is a schematic diagram of a system for controlling a Bluetooth speaker base according to some embodiments of the present disclosure, as illustrated in FIG. 6, the Bluetooth speaker base 500 may include a voice acquisition module 510, a digital signal processing module 520, a Bluetooth chip 530, and an audio output module 540.

The digital signal processing module 520 may be configured to receive the voice collected by the voice acquisition module 510, and perform signal processing such as echo cancellation, voice source localization, beamforming, and noise reduction on the collected voice to obtain clear voice data, and determine whether the voice data received includes the wake-up word to determine whether to enter the wake-up process. When the wake-up word is included, the wake-up process is entered, and the digital signal processing module 520 may further be configured to send the interruption identification for wake-up to the Bluetooth chip 530, and send the voice data to the Bluetooth chip 530 through the RMP.

The Bluetooth chip 530 runs the private RMP to establish the RMP connection between the Bluetooth speaker base and the mobile terminal. After the interruption identification for wake-up sent by the digital signal processing module 520 is received, the RMP module may trigger uplink high-speed data transmission process, i.e., compress the voice data sent by the digital signal processing module 520 based on the preset compression ratio, and send the compressed voice data to the mobile terminal 620.

The mobile terminal 620 is configured to receive the voice data sent by the Bluetooth chip 530, and forward the received voice data to the server 630.

The server 630 is configured to perform voice recognition on the received voice data, generate corresponding audio data according to the recognition result, and send the audio data to the mobile terminal 620, such that the mobile terminal 620 sends the audio data through the second profile connection to the Bluetooth chip 611 of the Bluetooth speaker 610. The Bluetooth chip 611 is configured to receive the audio data sent by the mobile terminal 620, and play the audio data through the audio output module 612.

With the system for controlling the Bluetooth speaker base according to embodiments of the present disclosure, the first profile connection and the second profile connection with the mobile terminal are established through the Bluetooth speaker base and the Bluetooth speaker, respectively, the voice data collected by the Bluetooth speaker base is obtained and compressed based on the preset compression ratio, and the compressed voice data is sent to the mobile terminal through the first profile connection. When the mobile terminal receives the voice data, the mobile terminal may decompress the received voice, and send the decompressed voice data to the server for voice recognition, so as to obtain the audio data. Then, the audio data returned by the mobile terminal may be received based on the second profile connection, and the audio output module of the Bluetooth speaker may be controlled to play the audio data, thereby achieving the voice recognition and interaction between the Bluetooth speaker and the Bluetooth speaker base and the mobile terminal, i.e., the bidirectional transmission of Bluetooth voice data between the Bluetooth speaker and the Bluetooth speaker base and the mobile terminal is achieved through the first profile connection and the second profile connection.

The first profile connection is the connection between the Bluetooth speaker base and the mobile terminal, it does not affect the transmission of voice interactive audio signal between the Bluetooth speaker and other devices. In addition, when the data is transmitted through the first profile connection, the compression ratio is negotiated with the terminal device, the voice and audio data compression is achieved by dynamically negotiating the data compression manner, the maximum data transmission volume can be ensured in the current environment, the bidirectional transmission rate of Bluetooth voice data can be improved, the high-speed bidirectional transmission of Bluetooth voice data can be achieved, and the voice recognition rate can be improved. Moreover, while ensuring the downlink audio playback quality of the Bluetooth speaker, and without changing the structure of the Bluetooth speaker, the delay of voice interaction from wake-up to recognition can be reduced, thereby improving user experience.

Figure 7:
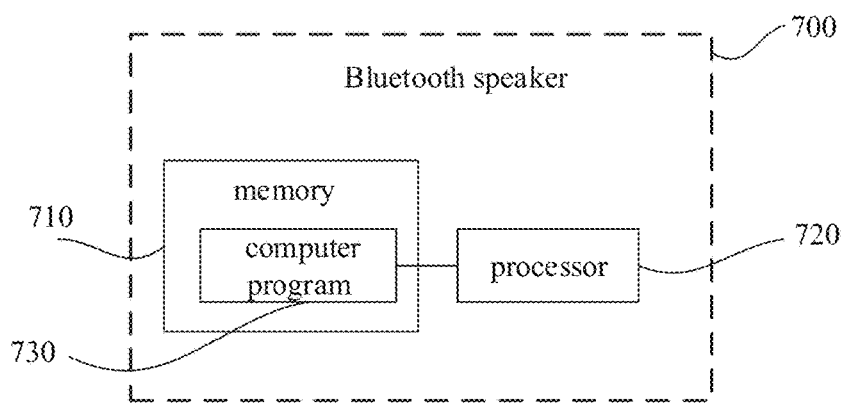
FIG. 7 is a schematic diagram of a Bluetooth speaker according to some embodiments of the present disclosure.

Embodiments of the present disclosure also provide a Bluetooth speaker. FIG. 7 is a schematic diagram of a Bluetooth speaker according to some embodiments of the present disclosure. As illustrated in FIG. 7, the Bluetooth speaker 700 may include a memory 710, a processor 720, and a computer program 730 stored in the memory 710 and executable by the processor 720. When the processor 720 executes the computer program 730, the method for controlling the Bluetooth speaker base according to any embodiment of the present disclosure is implemented.

Embodiments of the present disclosure also provide a non-transitory computer-readable storage medium having stored thereon a computer program that, when executed by a processor, causes the method for controlling the Bluetooth speaker base according to any embodiment of the present disclosure to be implemented.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may include one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A speaker base, comprising:
   a microphone array, configured to collect first audio signals;
   a digital signal processor, configured to:
   receive the first audio signals,
   process the first audio signals to obtain first audio data,
   determine whether the first audio data comprises a wake-up word, and
   send an interrupt signal to a Bluetooth chip in response to the first audio data comprising the wake-up word; and
   the Bluetooth chip, configured to:
   receive the first audio data in response to the interrupt signal, compress the first audio data based on a compression ratio and send the first audio data.

2. The speaker base of claim 1, wherein the speaker base is capable of coupling to a speaker, the digital signal processor is further configured to receive the first audio signals in response to an instruction from the Bluetooth chip, and the Bluetooth chip is further configured to send the instruction to the digital signal processor in response to detecting that the speaker base is coupled to the speaker through the Bluetooth chip.

3. The speaker base of claim 1, wherein the Bluetooth chip is further configured to send the first audio data to a mobile terminal.

4. The speaker base of claim 1, wherein the Bluetooth chip is further configured to send the first audio data to a mobile terminal through a first profile.

5. The speaker base of claim 4, wherein the first profile comprises a private remote mic profile RMP.

6. The speaker base of claim 1, wherein the Bluetooth chip is further configured to receive response data of the first audio data from a mobile terminal.

7. The speaker base of claim 1, wherein the Bluetooth chip is further configured to receive response data of the first audio data from a mobile terminal through a second profile.

8. The speaker base of claim 7, wherein the second profile comprises a standard advanced audio distribution profile A2DP.

9. The speaker base of claim 1, wherein the Bluetooth chip is further configured to compress the first audio data.

10. The speaker base of claim 1, wherein the Bluetooth chip is further configured to negotiate the compression ratio with a mobile terminal.

11. A method for controlling a speaker base, comprising:
    collecting first audio signals;
    processing the first audio signals to obtain first audio data;
    determining whether the first audio data comprises a wake-up word;
    compressing the first audio data based on a compression ratio; and
    sending the first audio data in response to the first audio data comprising the wake-up word.

12. The method of claim 11, wherein collecting the first audio signals comprises:
    collecting the first audio signals in response to detecting that the speaker base is coupled to a speaker.

13. The method of claim 11, wherein sending the first audio data comprises:
    send the first audio data to a mobile terminal through a first profile.

14. The method of claim 13, wherein the first profile comprises a private remote mic profile RMP.

15. The method of claim 11, further comprising:
    receive response data of the first audio data from a mobile terminal through a second profile.

16. The method of claim 15, wherein the second profile comprises a standard advanced audio distribution profile A2DP.

17. The method of claim 11, further comprising:
    negotiating the compression ratio with a mobile terminal.

18. A system, comprising:
    a speaker,
    a speaker base, capable of coupling to the speaker, and comprising:
    a microphone array, configured to collect first audio signals,
    a digital signal processor, configured to: receive the first audio signals, process the first audio signals to obtain first audio data, determine whether the first audio data comprises a wake-up word, and send an interrupt signal to a Bluetooth chip in response to the first audio data comprising the wake-up word; and
    the Bluetooth chip, configured to: receive the first audio data in response to the interrupt signal, compress the first audio data based on a compression ratio and send the first audio data; and
    a mobile terminal, configured to receive the first audio data.

* * * * *